United States Patent [19]

Storer, Sr.

[11] 4,241,283

[45] Dec. 23, 1980

[54] HYDRO-ELECTRIC POWER PLANT

[76] Inventor: Richard R. Storer, Sr., Egypt Rd., Damariscotta, Me. 04543

[21] Appl. No.: 939,698

[22] Filed: Sep. 5, 1978

[51] Int. Cl.³ .............................................. E02B 9/04
[52] U.S. Cl. ........................................ 290/54; 290/43; 405/75
[58] Field of Search .................... 290/42, 43, 53, 54; 416/9, 11, 85; 60/506; 405/75–78, 34

[56] References Cited

U.S. PATENT DOCUMENTS

| 447,915 | 3/1891 | Stephens | 290/43 |
|---|---|---|---|
| 1,487,391 | 3/1924 | Kochlin | 290/54 X |
| 2,097,286 | 10/1937 | McGee | 290/54 |
| 2,163,102 | 6/1939 | Odill | 290/54 X |
| 2,820,148 | 1/1958 | Southwick | 290/53 X |
| 4,039,847 | 8/1977 | Diggs | 290/42 |
| 4,053,787 | 10/1977 | Diggs | 290/54 |
| 4,137,005 | 1/1979 | Comstock | 290/53 X |

Primary Examiner—J. V. Truhe
Attorney, Agent, or Firm—Nicholas J. Aquilino

[57] ABSTRACT

A hydro-electric power plant for use in any location having flowing streams of water including a diversion dam which extends part way into the flowing stream to divert water to a spillway which includes a plurality of water wheels driven by the water flow to operate turbine-generators for the generation of electricity.

8 Claims, 3 Drawing Figures

WATER LEVEL

HYDRO-ELECTRIC POWER PLANT

BACKGROUND OF THE INVENTION

The present invention relates to a hydro-electric power plant using a diversion dam.

Increases in population and technological development have created unprecedented demands for new sources of energy. Water power has been long known as a source of potential energy for generating electricity and where it has been used, it is an efficient and clean source. Millions of gallons of water flow through the inland waters of the United States daily which represent a vast source of power that has not been exploited to anywhere near its full potential.

Most hydro-electric power plants are located adjacent dams and natural waterfalls. However, in most cases, these plants are located in remote locations where natural runoff is available or where a dam can be efficiently constructed and maintained. High dams require that the flow of water be stopped so that valuable acreage is flooded creating limitations on land use. Also, dams have created problems regarding the migration of fish upriver to the spawning grounds among other ecological imbalances.

The initial high costs of construction of conventional hydro plants, estimated to be twenty times higher than the costs of the subject invention, damage to the environment, public opposition to projects destroying the land, and costly impact studies are all avoided by the disclosed system. Additionally, this system is dependent only on our great natural, renewable water systems and not on oil, coal, nuclear energy or the whims of foreign nations.

Another disadvantage of the present hydro-electric power generating plants presently in use is that the prime movers and turbines over which the water flows to convert water into power are generally constructed in situ, and shut down of one of the units generally shuts down the whole plant.

Thus, most of the potential power resulting from water flow in many of the present waterways remains unused, particularly, in the smaller streams and waterways of this country. As for the larger rivers, this system would permit, for the first time, hydro-electric plants along some of our great rivers, such as the Hudson, Mississippi and Potomac.

Prior attempts at developing this potential hydroelectric power have been disclosed in the patent to Gilliland U.S. Pat. No. 757,909 which relate to a portable power dam; the patent to Diggs U.S. Pat. No. 4,053,787 which relates to a modular hydro-electric power plant; and the French Pat. No. 899,232 which relates to another modular type of hydro-electric installation. Other patents of interest include the patent to Flynn U.S. Pat. No. 921,687 which shows a hydro-electric power plant using the flow of a river, and the patent to Montgomery et al U.S. Pat. No. 2,641,108 which relates to a hydro-electric jetey using wave power to generate electricity.

The present invention relates to a hydro-electric power plant using a diversion dam where river waters are harnessed without the usual dams in order to harness the powers of free flowing rivers at any location in the world. The power plant of the present invention does not require flooding or building of artificial lakes and, thus, does not restrict commercial ship traffic nor does it interfere with the natural flow of the river and the marine inhabitants thereof. The power plant and diversion dam system of the present invention is not restricted to specific locations and can be placed anywhere along a waterway. The system may be used as often as is needed or wanted along the same waterway thereby decreasing the cost of producing electricity, decreasing the cost to the consumer and meeting the increasing demands of our nation. Operational and repair costs are far less than any conventional plant using nuclear or fuel burning energy sources.

SUMMARY OF THE INVENTION

The present invention relates to a hydro-electric plant using a diversion dam which projects partway into a flowing river or stream. A series of water wheels and turbines positioned at the end of the dam convert the water flow to electric power. The diversion dam includes a series of flood or control gates to allow water to be released when it is abundant and to contain the water at the head gate when it is needed. Other features of the present invention include the use of a debris fence and a water purification system. The water wheels include hydraulic lifts to allow the wheel to be raised or lowered thus enabling the wheels to be placed in or out of operation, as needed.

DESCRIPTION OF THE PREFERRED EMBODIMENT

Figure 1:
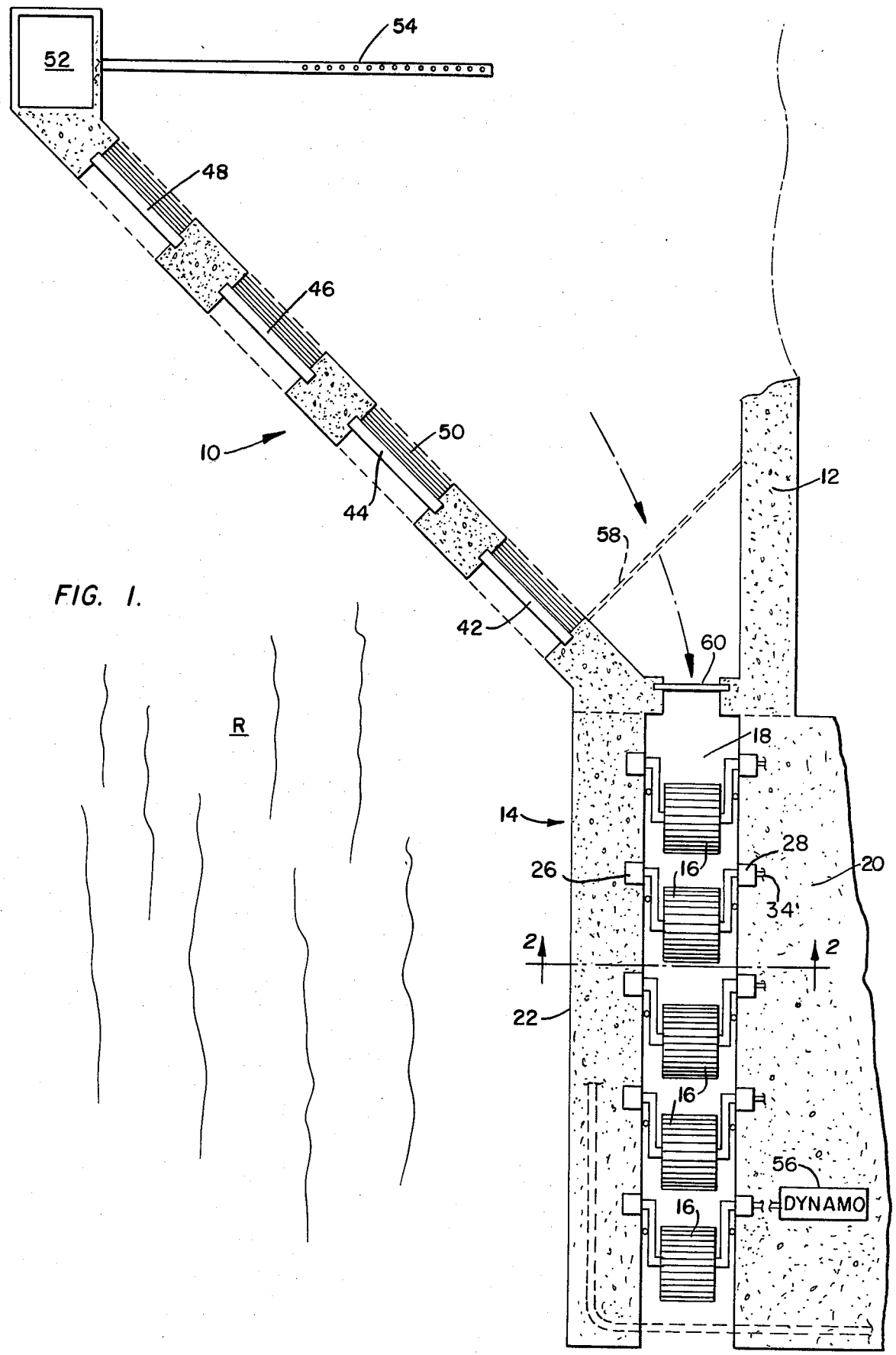
FIG. 1 is a plan view of a hydro-electric power plant and diversion dam of the present invention.

FIG. 1 illustrates a hydro-electric power plant using a diversion dam in accordance with the present invention. A diversion dam 10 is shown projecting partway into a river R. The open end of the diversion dam 10 faces upstream of the river flow so that water is captured between the angularly positioned dam 10 and retaining wall 12 as it flows downstream and is directed toward the power plant 14. The power plant 14 includes a series of water wheels 16 which are positioned in a concrete spillway 18 formed by a concrete wall 20 at the river bank and a second concrete wall 22 and positioned on the river bottom at a distance parallel to the first wall 20. The water wheels 16 are mounted between the wall 20 and wall 22 and are positioned in the spillway 18 so that a normal level of water flowing in the spillway 18 will rotate the water wheels. A total of five independently operated water wheels are shown; however, it will be appreciated that any number of water wheels can be used in keeping within the scope of the present invention.

Figure 2:
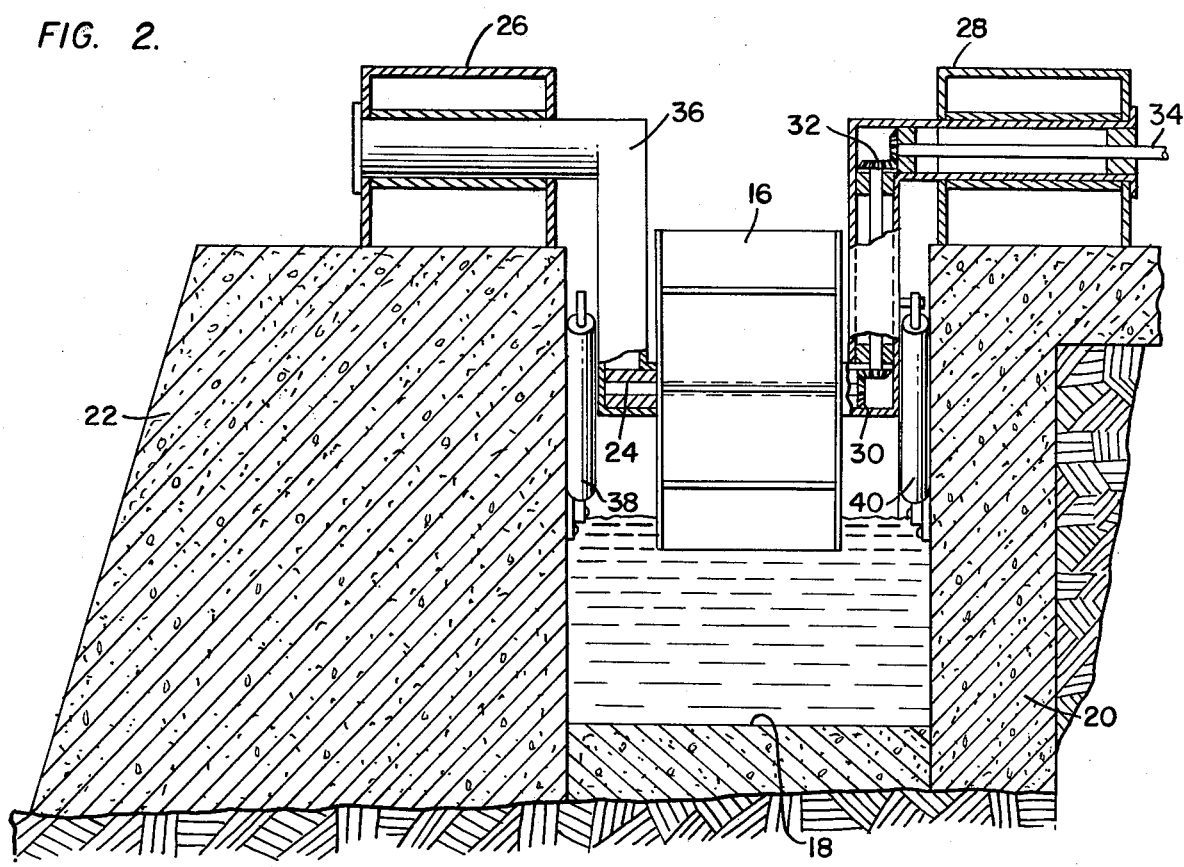
FIG. 2 is a sectional view of FIG. 1 taken along lines 2—2.

As best illustrated in FIG. 2, each wheel 16 is mounted on a shaft 24 which is mounted on suitable bearing box mounts 26 and 28. The wheel shaft is connected to gears 30 and 32 to an output drive shaft 34.

Figure 3:
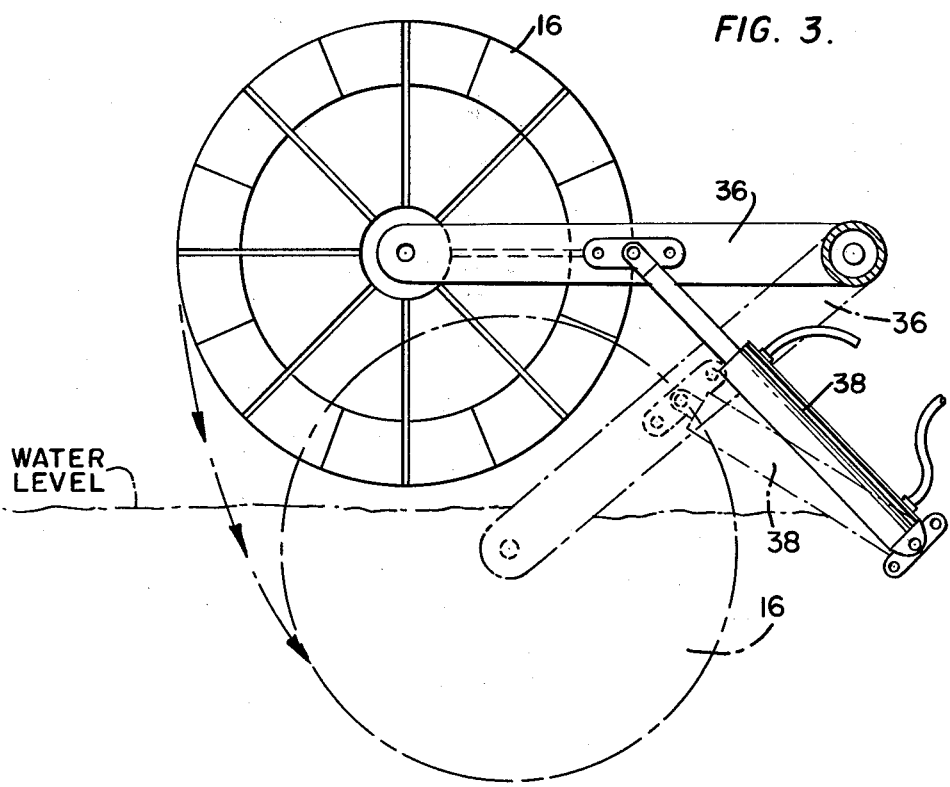
FIG. 3 is a detail of the wheel construction of FIG. 1.

FIG. 3 illustrates a more detailed view of a water wheel 16 showing the adjustable mounting feature thereof. A wheel 16 is mounted on a pivot arm 36 which is hydraulically actuated by a pair of hydraulic pistons 34 and 40, one of which is mounted on each side of the wheel 16. When the pistons are actuated, they are able to lift the wheels 16 out of the water to enable it to either be temporarily taken off the line or removed for replacement or repair. The pivotal mounting also permits the wheel to be raised or lowered to accommodate various levels of water flow in the spillway 18 when necessary.

The diversion dam 10 includes a series of flood gates 42, 44, 46 and 48 which are spaced along the length of the diversion dam 10. Each of the flood gates may be selectively opened to control the amount of water flow channeled to the power plant 14 by the diversion dam 10. Each control gate includes a steel grate walkway 50 to permit access to the entire length of the dam when the gates are opened.

The diversion dam is preferably formed with a chemical injection house 52 which includes a chemical injection pipe 54 extending into the waterflow path of the diversion dam 10. This provides a means for water purification should this be necessary by injection of chemicals into the flowing water as it enters the mouth of diversion dam 10.

Each output drive shaft 34 of the water wheels is connected to a suitable turbine-dynamo generator 56 to generate electricity in a conventional manner. Whereas, only one generator is shown, it will be appreciated that there may be as many as there are water wheels.

The operation of the system is apparent in that water is diverted by the diversion dam into the spillway 18 and past the water wheels 16. The wheels are driven by the water to operate the dynamo turbine power generating units.

A feature includes barrier gate 58 which is positioned just below the first control gate to catch all flotsam and debris and hold it so that no foreign material will reach the spillway where it could do damage to one of the wheels. A control gate 60 at the entrance to the spillway provides a means to adjust the amount of water which flows through the spillway and past the water wheels.

Inasmuch as the present invention is subject to many variations, modifications and changes in detail, it is intended that all subject matter discussed above or shown in the accompanying drawings be interpreted as illustrative and not in a limiting sense.

What is claimed is:

1. A hydro-electric power system for use in a flowing stream of water comprising a dam structure projecting part way into said flowing stream having an open end and a closed end, said dam structure being disposed at an acute angle relative to a shore line of said stream forming a progressively narrower opening between said dam and said shore line from said open end to said closed end whereby said open end projects into said flowing stream to receive and collect water causing it to flow between said dam and said shore line directed from said open end of said dam to said closed end; and means for generating power including a spillway connected to the closed end of said diversion dam in fluid communication with said water collected by said dam whereby water flows in said spillway, at least one water driven wheel positioned in said spillway adapted to be turned by said water flow in said spillway, turbine-generator means for producing power and driving means connected between said water wheel and said turbine generator means to drive the same.

2. The system of claim 1 further including flood gates in said diversion dam for regulating water flow behind said dam.

3. The system of claim 1 further including a control gate between said diversion dam and said spillway for controlling the amount of water into said spillway.

4. The system of claim 1 further including barrier means between said diversion dam and said spillway to prevent entrance of debris into said spillway.

5. The system of claim 1 further includes means for purifying water collected behind said dam.

6. The system of claim 5 wherein said purifying means includes a chemical injection station and an injection pipe for injecting chemicals in said collected water.

7. The system of claim 1 wherein said water wheel includes means for raising and lowering said wheel into and out of said spillway water flow.

8. The system of claim 7 wherein said raising and lowering means includes a pivot arm, one end of which is fixed and the other end of which is connected to said wheel and a hydraulic operating means connected to said pivot arm for pivoting said arm to raise and lower said wheel.

* * * * *